(12) United States Patent
Yang et al.

(10) Patent No.: US 9,995,867 B2
(45) Date of Patent: Jun. 12, 2018

(54) LIGHT SOURCE, BACKLIGHT MODULE AND DISPLAY APPARATUS

(71) Applicant: BOE Technology Group Co., Ltd., Beijing (CN)

(72) Inventors: Zezhou Yang, Beijing (CN); Qing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days. days.

(21) Appl. No.: 15/124,094

(22) PCT Filed: May 7, 2015

(86) PCT No.: PCT/CN2015/078457
§ 371 (c)(1),
(2) Date: Sep. 7, 2016

(87) PCT Pub. No.: WO2016/086596
PCT Pub. Date: Jun. 9, 2016

(65) Prior Publication Data
US 2017/0017029 A1    Jan. 19, 2017

(30) Foreign Application Priority Data
Dec. 2, 2014   (CN) .......................... 2014 1 0721353

(51) Int. Cl.
*F21V 9/16*    (2006.01)
*F21V 8/00*    (2006.01)
*G02F 1/1335*  (2006.01)

(52) U.S. Cl.
CPC ......... *G02B 6/0026* (2013.01); *G02F 1/1335* (2013.01)

(58) Field of Classification Search
CPC ........................... G02B 6/0026; G02F 1/1335
(Continued)

(56) References Cited

U.S. PATENT DOCUMENTS

| 8,355,098 B2* | 1/2013 | Park ................... G02F 1/133609 313/487 |
| 2009/0195730 A1* | 8/2009 | Park ................... G02F 1/133609 349/71 |
| 2011/0317398 A1* | 12/2011 | Moeck .................... F21S 10/02 362/84 |

FOREIGN PATENT DOCUMENTS

| CN | 101344234 A | 1/2009 |
| CN | 102444792 A | 5/2012 |

(Continued)

OTHER PUBLICATIONS

International Search Report and Written Opinion, including English translation of Box No. V, for International Application No. PCT/CN2015/078457, dated Sep. 2, 2015, 9 pages.

(Continued)

*Primary Examiner* — Paultep Savusdiphol
(74) *Attorney, Agent, or Firm* — Westman, Champlin & Koehler, P.A.

(57) ABSTRACT

The present disclosure provides a light source, a backlight module and a display apparatus. The light source includes: a light emitting diode chip; and a fluorescent powder layer arranged to face towards the light emitting diode chip and configured to receive a first light emitted from the light emitting diode chip and to emit a second light with a wavelength different from that of the first light, wherein the light emitting diode chip and the fluorescent powder layer are moveable with respect to each other such that quantity of fluorescent powder in the fluorescent powder layer excited by the light emitted from the light emitting diode chip increases or decreases. In the above solution, the light emitting diode chip and the fluorescent powder layer are movable with respect to each other, so as to adjust color temperature of backlight conveniently.

19 Claims, 2 Drawing Sheets

(58) Field of Classification Search
USPC .............. 362/606, 608, 616, 84, 97.3, 319
See application file for complete search history.

(56) References Cited

FOREIGN PATENT DOCUMENTS

| | | |
|---|---|---|
| CN | 102565921 A | 7/2012 |
| CN | 102748595 A | 10/2012 |
| CN | 102797985 A | 11/2012 |
| CN | 104456207 A | 3/2015 |
| CN | 204201589 U | 3/2015 |
| JP | 2008-300117 A | 12/2008 |
| JP | 2009-181955 A | 8/2009 |

OTHER PUBLICATIONS

First Office Action, including Search Report, for Chinese Patent Application No. 201410721353.0, dated Jan. 18, 2016, 13 pages.
Second Office Action for Chinese Patent Application No. 201410721353.0, dated Jul. 19, 2016, 11 pages.

* cited by examiner

LIGHT SOURCE, BACKLIGHT MODULE AND DISPLAY APPARATUS

CROSS-REFERENCE TO RELATED APPLICATION

This application is a Section 371 National Stage Application of International Application No. PCT/CN2015/078457, filed on 7 May 2015, which published as WO 2016/086596 A1 on 9 Jun. 2016, and claims priority to Chinese Patent Application No. 201410721353.0, filed with SIPO on Dec. 2, 2014, the contents of which are incorporated herein by reference in their entirety.

BACKGROUND OF THE DISCLOSURE

Field of the Disclosure

The present disclosure generally relates to a light source, a backlight module and a display apparatus.

Description of the Related Art

A backlight module of the conventional liquid crystal display apparatus typically includes a white LED bar and a light guide plate. The white LED bar includes a blue LED chip and a yellow fluorescent power layer packaged with together. In this way, if the color temperature of backlight needs to be changed, a whole LED bar must be replaced.

SUMMARY

An embodiment of the present application is intended to provide a light source, a backlight module and a display apparatus, which may adjust the color temperature of the backlight conveniently by moving the light emitting diode chip and the fluorescent power layer with respect to each other.

In accordance with an embodiment of the present application, it provides a light source, including: a light emitting diode chip; and a fluorescent powder layer arranged to face towards the light emitting diode chip and configured to receive first light emitted from the light emitting diode chip and to emit second light with a wavelength different from that of the first light, wherein the light emitting diode chip and the fluorescent powder layer are moveable with respect to each other such that quantity of fluorescent powder in the fluorescent powder layer excited by the light emitted from the light emitting diode chip increases or decreases.

In an embodiment, the light emitting diode chip and the fluorescent powder layer are moveable towards each other or away from each other.

In an embodiment, the fluorescent powder layer has a recess on its side facing towards the light emitting diode chip, the light emitting diode chip being accommodated within the recess, and the light emitting diode chip and the fluorescent powder layer are moveable with respect to each other such that the light emitting diode chip moves close to or away from the bottom of the recess.

In an embodiment, the light source further includes: a carrier on which a plurality of light emitting diode chips are arranged at a predetermined spacing, the fluorescent powder layer having a plurality of recesses on its side facing towards the light emitting diode chips, the plurality of light emitting diode chips being accommodated within the plurality of recesses respectively, wherein the plurality of light emitting diode chips are movable towards or away from the bottom of the recesses.

In an embodiment, the light source further includes: a carrier having a plurality of protrusions which are arranged at a predetermined spacing on a side of the carrier facing towards the fluorescent powder layer, a plurality of light emitting diode chips being arranged at a predetermined spacing on the plurality of protrusions of the carrier respectively, the fluorescent powder layer having a plurality of recesses on its side facing towards the light emitting diode chips, the plurality of light emitting diode chips being accommodated within the plurality of recesses respectively, wherein the light emitting diode chips are movable towards or away from the bottoms of the recesses.

In an embodiment, the fluorescent powder layer is fixed.

In an embodiment, the fluorescent powder layer has an elongated shape, the carrier having a strip shape, and the plurality of recesses are arranged in a row in a longitudinal direction of the fluorescent powder layer and the plurality of light emitting diode chips and the plurality of protrusions are arranged in a row in a longitudinal direction of the carrier.

In an embodiment, the side of the fluorescent powder layer facing towards the light emitting diode chips has a serrate shape.

In an embodiment, the side of the fluorescent powder layer facing away from the light emitting diode chips is configured to adhere onto a light incidence face of a light guide plate.

In an embodiment, the light emitting diode chip and the fluorescent powder layer are movable with respect to each other in a predetermined direction, and a thickness of the fluorescent powder layer at least at a location facing towards the light emitting diode chip increases or decreases along the predetermined direction.

In an embodiment, the fluorescent powder layer has an elongated shape, the predetermined direction being perpendicular to a longitudinal direction of the fluorescent powder layer, and the fluorescent powder layer has a wedged portion at least at a location facing towards the light emitting diode chip.

In an embodiment, the fluorescent powder layer includes a first fluorescent powder layer and a second fluorescent powder layer, and when viewed in a plane perpendicular to the longitudinal direction of the fluorescent powder layer, an end of the first fluorescent powder layer with a smaller thickness and an end of the second fluorescent powder layer with a larger thickness are located on a same side in the predetermined direction, and the first fluorescent powder layer and the second fluorescent powder layer are moveable towards each other or away from each other.

In an embodiment, in a plane defined by the predetermined direction and the longitudinal direction of the first fluorescent powder layer and the second fluorescent powder layer, a projection of the first fluorescent powder layer in a direction perpendicular to the plane is at least partially overlapped with that of the second fluorescent powder layer in the direction perpendicular to the plane.

In an embodiment, the predetermined direction is substantially perpendicular to a direction in which the light emitting diode chip and the fluorescent powder layer face towards each other.

In an embodiment, the light emitting diode chip is fixed.

In an embodiment, the light emitting diode chip is a blue light emitting diode chip.

In an embodiment, the fluorescent powder layer is a yellow fluorescent powder layer.

In accordance with an embodiment of the present application, it provides a backlight module, including: the light source as described in any one of the above embodiments; and a light guide plate, having a light incidence face from which at least one part of light emitted from the light source enters the light guide plate.

In accordance with an embodiment of the present application, it provides a display apparatus, including: the backlight module as described in any one of the above embodiments.

DETAILED DESCRIPTION OF EMBODIMENTS

The specific embodiments of the present application will be described with reference to accompanying figures thereof.

The specific embodiments of the present application will be described with reference to figures by ways of examples and described specifically in the present text. The described embodiments are only exemplified embodiments, instead of all of embodiments. The present application is not limited to the following embodiments.

In accordance with a general concept of an embodiment of the present application, it provides a light source, including: a light emitting diode chip; and a fluorescent powder layer arranged to face towards the light emitting diode chip and configured to receive a first light emitted from the light emitting diode chip and to emit a second light with a wavelength different from that of the first light, wherein the light emitting diode chip and the fluorescent powder layer are moveable with respect to each other such that quantity of the fluorescent powder in the fluorescent powder layer excited by the light emitted from the light emitting diode chip increases or decreases.

In addition, for the purpose of explanation, numerous specific details are set forth in the following detailed description to provide a thorough understanding to the embodiments of the present invention. It is obvious, however, that one or more embodiments can also be implemented without these specific details. In other instances, well-known structures and devices are shown in an illustrative manner so as to simplify the drawings.

Figure 1:
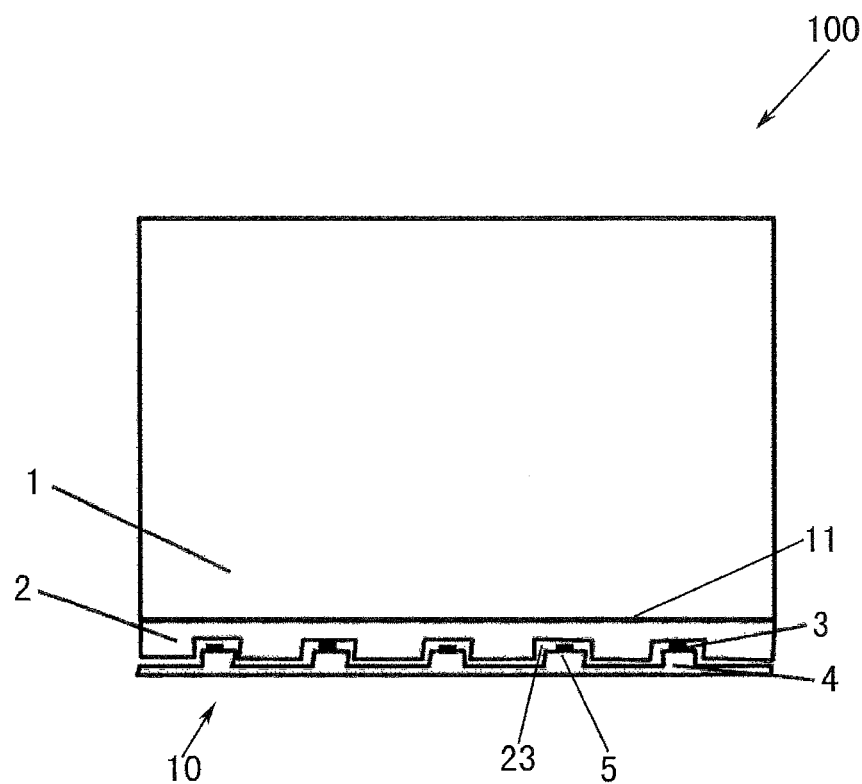
FIG. 1 is a schematic view showing a backlight module according to an embodiment of the present application.
Figure 2:
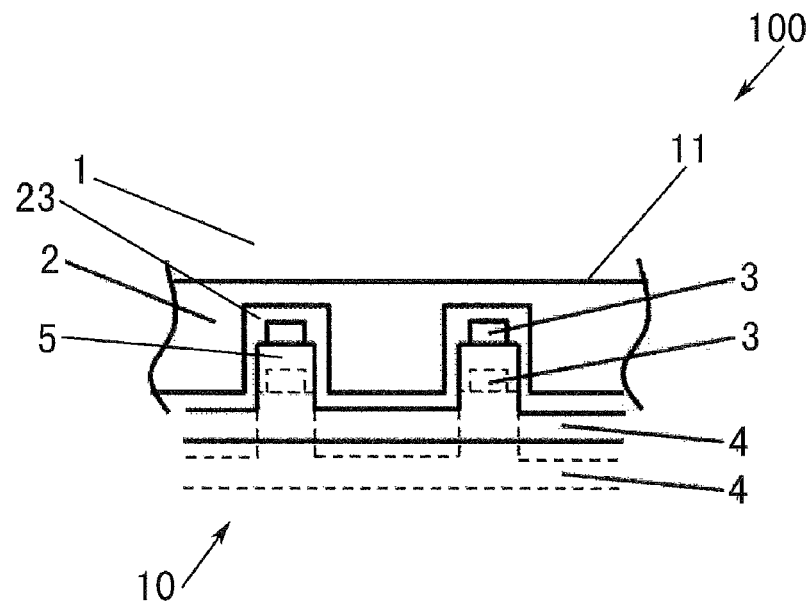
FIG. 2 is a schematic locally magnified view showing a backlight module according to an embodiment of the present application.

FIGS. 1 and 2 show a backlight module 100 according to an embodiment of the present application. The backlight module 100 includes a light source 10 and a light guide plate 1. At least part of the light emitted from the light source 10 enters the light guide plate 1 from a light incidence face 11 of the light guide plate 1. In examples shown in FIGS. 1-2, a fluorescent powder layer 2 is arranged between the light incidence face 11 of the light guide plate 1 and light emitting diode chips 3.

As shown in FIGS. 1-2, the light source 10 according to an embodiment of the present application includes: a light emitting diode chip 3; and a fluorescent powder layer 2 arranged to face towards the light emitting diode chip 3 and configured to receive a first light emitted from the light emitting diode chip 3 and to emit a second light with a wavelength different from that of the first light. The light emitting diode chip 3 and the fluorescent powder layer 2 are moveable with respect to each other (for example, by a moving device or an adjusting device), such that quantity of the fluorescent powder in the fluorescent powder layer 2 excited by the light emitted from the light emitting diode chip 3 increases or decreases. In this way, the color temperature of the backlight of the backlight module may be adjusted conveniently.

As illustrated in FIGS. 1-2, according to an example of the present application, the light emitting diode chip 3 and the fluorescent powder layer 2 are moveable towards each other or away from each other, for example, the moving directions of the light emitting diode chip 3 and the fluorescent powder layer 2 are configured such that the emitting diode chip 3 moves towards or away from the fluorescent powder layer 2. In this way, the relative position of the light emitting diode chip 3 and the fluorescent powder layer 2 may be adjusted in a simple manner, without changing structures of the conventional backlight module in essential.

In an example of the present application, the fluorescent powder layer 2 may be formed by adhering fluorescent powders onto a transparent element, or by mixing and curing the fluorescent powders with transparent curable liquid matters such as adhesives. The light emitting diode chip 3 may include any suitable light emitting diode chip such as a blue light emitting diode chip 3. The fluorescent powder layer 2 may include any suitable fluorescent powder layers such as a yellow fluorescent powder layer 2.

As shown in FIGS. 1-2, the fluorescent powder layer 2 has a recess 23 on its side facing towards the light emitting diode chip 3, and the light emitting diode chip 3 is accommodated within the recess 23. The light emitting diode chip 3 and the fluorescent powder layer 2 are moveable with respect to each other such that the light emitting diode chip 3 moves close to or away from the bottom of the recess 23. By providing the recess 23, the light emitting diode chip 3 may have a certain movable space. In this way, the color temperature of the backlight may be adjusted without increasing the space that the light emitting diode chip 3 and the fluorescent powder layer 2 occupy in essential.

With reference to FIGS. 1-2, in an example of the present application, the light source 10 may further include: a carrier 4 on which a plurality of light emitting diode chips 3 are arranged by a predetermined spacing, the fluorescent powder layer 2 having a plurality of recesses 23 on its side facing towards the light emitting diode chips 3, the plurality of light emitting diode chips 3 being accommodated within the plurality of recesses 23 respectively. The light emitting diode chips 3 are movable towards or away from the bottom of the recesses 23. In this way, the plurality of light emitting diode chips 3 may move along with the carrier 4 such as a printed circuit board together, so that the color temperature of the backlight may be adjusted by means of a simple mechanism.

As an example, the light source 10 may also include: a carrier 4 having a plurality of protrusions 5 which are arranged by a predetermined spacing on its side facing towards the fluorescent powder layer 2, the plurality of light emitting diode chips 3 being arranged by a predetermined spacing on the plurality of protrusions 5 of the carrier, the fluorescent powder layer 2 having a plurality of recesses 23 on its side facing towards the light emitting diode chips 3. The plurality of light emitting diode chips 3 are accommodated within the plurality of recesses 23 respectively, or the plurality of light emitting diode chips 3 and at least part of the corresponding plurality of protrusions 5 are accommodated within the plurality of recesses 23 respectively. The light emitting diode chips 3 are movable towards or away from the bottom of the recesses 23. In this way, deeper recesses 23 may be provided to adjust the color temperature of the backlight in a relatively large range.

As an example, the fluorescent powder layer 2 is fixed. The light emitting diode chips 3 may be moveable.

As illustrated in FIGS. 1-2, in an example of the present application, the fluorescent powder layer 2 may have an elongated shape, and the carrier 4 may have a striped shape. The carrier 4 may be a printed circuit board or any other suitable components. As shown in FIGS. 1-2, the plurality of recesses 23 are arranged in a row (for example, equidistantly) in a longitudinal direction of the fluorescent powder layer 2 and the plurality of light emitting diode chips 3 are arranged in a row (for example, equidistantly) in a longitudinal direction of the carrier 4. Or, in the case that the protrusions 5 are provided, the plurality of recesses 23 are arranged in a row (for example, equidistantly) in a longitudinal direction of the fluorescent powder layer 2 and the plurality of light emitting diode chips 3 and the plurality of protrusions 5 are arranged in a row (for example, equidistantly) in a longitudinal direction of the carrier 4. In this way, since the plurality of recesses 23, the plurality of light emitting diode chips 3 and the plurality of protrusions 5 are arranged in a row, the color temperature of the backlight may be adjusted in a wide range by a simple mechanism without changing structures of the conventional backlight module in essential and increasing the space that the light emitting diode chips 3 and the fluorescent powder layer 2 occupy.

As illustrated in FIGS. 1-2, the side of the fluorescent powder layer 2 facing towards the light emitting diode chips 3 may have a serrate shape. By means of forming the plurality of protrusions by means of the serrate shape, the process for producing the fluorescent powder layer 2 becomes simple and easy to achieve.

In accordance with an embodiment of the present application, the relative movement of the light emitting diode chips 3 and the fluorescent powder layer 2 may be achieved by using a screw. In order to accurately position the one of the light emitting diode chips 3 and the fluorescent powder layer 2 that is moved, a sliding rail may be provided to guide the one of the light emitting diode chips 3 and the fluorescent powder layer 2 that is moved. For example, sliding rails may be provided at two ends of the printed circuit board to guide the printed circuit board. In addition, instead of the moving device or adjusting device including the screw and the sliding rail, an embodiment of the present application may also use other suitable moving devices or adjusting devices.

As illustrated in FIGS. 1-2, the fluorescent powder layer 2 may be adhered or coated on a light incidence face 11 of a light guide plate 1, for example, the side of the fluorescent powder layer 2 away from the light emitting diode chips 3 is configured to adhere onto the light incidence face 11 of the light guide plate 1. The light emitting diode chips 3 may move towards the light incidence face 11 of the light guide plate 1 or away from the light incidence face 11 of the light guide plate 1. In this way, more light emitted from the light source 10 may be incident into the light incidence face 11 of the light guide plate 1 and the structure for mounting the fluorescent powder layer 2 may become simple.

In accordance with an example of the present application, the carrier may not be provided. Instead, the light emitting diode chips 3 may be mounted on the adjusting device or the moving device for adjusting the position of the light emitting diode chips 3.

In FIG. 2, when the light emitting diode chips 3 are closer to the light guide plate 1, the thickness of the fluorescent powder layer 2 excited is thinner. It is a high color temperature state. In contrast, when the light emitting diode chips 3 are farther from the light guide plate 1, i.e., are located at the position indicated by the dashed line, the thickness of the fluorescent powder layer 2 excited will be increased correspondingly. It is a low color temperature state.

In the example shown in FIGS. 1-2, by changing the relative position of the light emitting diode chips 3 and the fluorescent powder layer 2, different quantities of yellow fluorescent powders may be excited. Then the excited yellow light is mixed with a blue light to obtain white light with different color temperatures, so as to achieve adjustment of the backlight color temperature.

In the present application, the color temperature may be changed by simply adjusting the distance between the light emitting diode chips 3 and the light guide plate 1. In addition, the thickness of the fluorescent powder layer 2 is not constant, but may be modified as required. Thus, the color temperature may be adjusted within a very large range.

Figure 3:
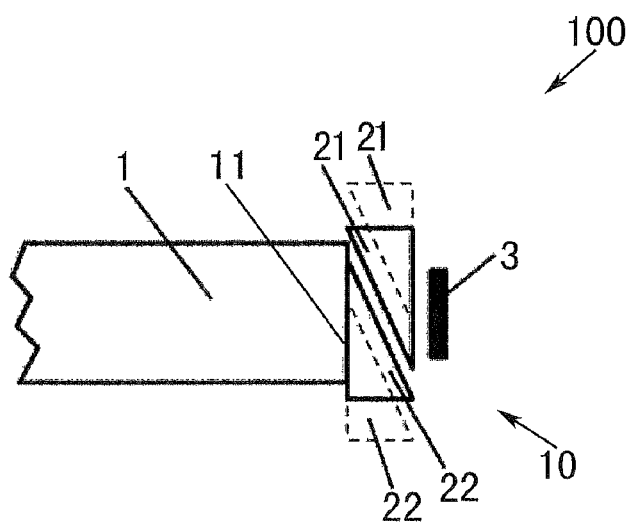
FIG. 3 is a schematic locally magnified view showing a backlight module according to another embodiment of the present application.

FIG. 3 shows a backlight module 100 according to another embodiment of the present application. The backlight module 100 includes a light source 10 and a light guide plate 1. At least part of the light emitted from the light source 10 enters the light guide plate 1 from a light incidence face 11 of the light guide plate 1. In shown examples, a fluorescent powder layer 2 is arranged between the light incidence face 11 of the light guide plate 1 and a light emitting diode chip 3.

As shown in FIGS. 1-2, the light source 10 according to an embodiment of the present application includes: a light emitting diode chip 3; and a fluorescent powder layer 2 arranged to face towards the light emitting diode chip 3 and configured to receive a first light emitted from the light emitting diode chip 3 and to emit a second light with a wavelength different from that of the first light. The light emitting diode chip 3 and the fluorescent powder layer 2 are moveable with respect to each other (for example, by a moving device or an adjusting device), such that quantity of the fluorescent powder in the fluorescent powder layer 2 excited by the light emitted from the light emitting diode chip 3 increases or decreases. In this way, the color temperature of the backlight of the backlight module may be adjusted conveniently.

In an example of the present application, the fluorescent powder layer 2 may be formed by adhering fluorescent powders onto a transparent element, or by mixing and curing the fluorescent powders with transparent curable liquid matters such as adhesives. The light emitting diode chip 3 may include any suitable light emitting diode chips such as a blue light emitting diode chip 3. The fluorescent powder layer 2 may include any suitable fluorescent powder layers such as a yellow fluorescent powder layer 2.

As seen from FIG. 3, the light emitting diode chip 3 and the fluorescent powder layer 2 are movable with respect to each other in a predetermined direction (for example, up-and-down direction in FIG. 3), such that the thickness of the fluorescent powder layer 2 at least at an location facing towards the light emitting diode chip 3 increases or decreases along the predetermined direction. The predetermined direction may be substantially perpendicular to a direction in which the light emitting diode chip 3 and the fluorescent powder layer 2 face each other (for example, left-and-right direction in FIG. 3). Thus, the color temperature of the backlight may be adjusted by simple structure of the fluorescent powder layer. In the case that the predetermined direction may be substantially perpendicular to a direction in which the light emitting diode chip 3 and the fluorescent powder layer 2 face each other, i.e., in the case that the fluorescent powder layer 2 is movable in a direction parallel to the light incidence face 11 of the light guide plate 1, the color temperature of the backlight may be adjusted without increasing the size of the light source 10 in the direction in which the light emitting diode chip 3 and the fluorescent powder layer 2 face each other (left-and-right direction in FIG. 3).

As shown in FIG. 3, the fluorescent powder layer 2 may have an elongated shape. The predetermined direction may be perpendicular to the longitudinal direction of the fluorescent powder layer 2. And the fluorescent powder layer 2 has a wedged portion (having a wedged section) at least at a location facing towards the light emitting diode chip 3. In this way, the fluorescent powder layer 2 has a simple structure and is easy to produce.

In the example shown in FIG. 3, the fluorescent powder layer 2 includes a first fluorescent powder layer 21 and a second fluorescent powder layer 22. When viewed in a plane perpendicular to the longitudinal direction of the first fluorescent powder layer 21 and the second fluorescent powder layer 22, the end of the first fluorescent powder layer 21 with a small thickness and the end of the second fluorescent powder layer 22 with a large thickness are located on the same side in the predetermined direction (up-and-down direction in FIG. 3). The first fluorescent powder layer 21 and the second fluorescent powder layer 22 are movable towards each other or away from each other. Use of the two fluorescent powder layers may enhance the range of adjustment. As an example, in a plane defined by the predetermined direction and the longitudinal direction of the fluorescent powder layer (the first fluorescent powder layer and the second fluorescent powder layer) (the plane parallel to the light incidence face 11 of the light guide plate 1 in FIG. 3), a projection of the first fluorescent powder layer 21 in a direction perpendicular to the plane is at least partially overlapped with that of the second fluorescent powder layer 22 in the direction perpendicular to the plane. In this way, a large range of adjustment may be achieved in a small space.

The light emitting diode chip 3 may be fixed. Only the fluorescent powder layer 2 (for example one of the first fluorescent powder layer 21 and the second fluorescent powder layer 22) is movable to simplify the mechanism for moving the light emitting diode chip 3 and the fluorescent powder layer 2 with respect to each other.

In accordance with an embodiment of the present application, the relative movement of the light emitting diode chip 3 and the fluorescent powder layer 2 (for example, one of the first fluorescent powder layer 21 and the second fluorescent powder layer 22) may be achieved by using a screw. In order to accurately position the one of the light emitting diode chip 3 and the fluorescent powder layer 2 that is moved, a sliding rail may be provided to guide the one of the light emitting diode chips 3 and the fluorescent powder layer 2 that is moved. For example, sliding rails may be provided at two ends of the fluorescent powder layer 2 to guide the fluorescent powder layer 2. In addition, instead of the moving device or adjusting device including the screw and the sliding rail, an embodiment of the present application may also use other suitable moving devices or adjusting devices.

In the example shown in FIG. 3, the first fluorescent powder layer 21 and the second fluorescent powder layer 22 have wedged shapes opposite to each other in the up-and-down direction and the relative position of the first fluorescent powder layer 21 and the second fluorescent powder layer 22 may be adjusted. As the light emitting diode chip 3 has a certain light emitting angle, more quantity of fluorescent powders are excited when the first fluorescent powder layer 21 and the second fluorescent powder layer 22 are located closer to each other. It is a low color temperature state. In contrast, when the first fluorescent powder layer 21 and the second fluorescent powder layer 22 are located farther from each other, i.e., are located at the position indicated by the dashed line, less quantity of fluorescent powders are excited. It is a high color temperature state. The color temperature may be changed by simply adjusting the relative position of the first fluorescent powder layer 21 and the second fluorescent powder layer 22.

In the example shown in FIG. 3, by changing the relative position of the first fluorescent powder layer 21 and the second fluorescent powder layer 22 in shape of wedges, different quantities of yellow fluorescent powders may be excited. Then the excited yellow light is mixed with a blue light to obtain white light with different color temperatures, so as to achieve adjustment of the color temperature of the backlight.

In accordance with an embodiment of the present application, a display apparatus is also provided by the present application, the display apparatus including: the backlight module 100 as described in any one of the above embodiments. Since the light emitting diode chip 3 and the fluorescent powder layer 2 of the backlight module 100 are movable with respect to each other, the color temperature of the backlight may be adjusted conveniently.

The display apparatus may be a liquid crystal display apparatus or any display apparatus and other apparatus that need backlight.

Although some embodiments of the present application as described above have been described, the present application is not limited to the above embodiments. For example, although the above embodiments describe adjustment of color temperature, the light source according to the embodiments of the present application may also be used to adjust ratio of blue light, and thus may suppress the visual fatigue caused by blue light.

The above embodiments are illustrative, instead of limiting the present application. It would be appreciated by those skilled in the art that various modifications or variations of the above embodiments and equivalents thereof will also fall within the scope of the present invention, without departing from the scope and spirit of the present application. The scope of the present application is defined by the appended claims.

What is claimed is:
1. A light source, comprising:
   a light emitting diode chip; and
   a fluorescent powder layer arranged to face towards the light emitting diode chip and configured to receive first light emitted from the light emitting diode chip and to emit second light with a wavelength different from that of the first light,
   wherein the light emitting diode chip and the fluorescent powder layer are moveable with respect to each other such that quantity of fluorescent powder in the fluorescent powder layer excited by the light emitted from the light emitting diode chip increases or decreases, and
   wherein the fluorescent powder layer has a recess on its side facing towards the light emitting diode chip, the light emitting diode chip being accommodated within the recess, and the light emitting diode chip and the fluorescent powder layer are moveable with respect to each other such that the light emitting diode chip moves close to or away from the bottom of the recess.

2. The light source according to claim 1, wherein the light emitting diode chip and the fluorescent powder layer are moveable towards each other or away from each other.

3. The light source according to claim 1, further comprising:
a carrier on which a plurality of light emitting diode chips are arranged at a predetermined spacing, the fluorescent powder layer having a plurality of recesses on its side facing towards the light emitting diode chips, the plurality of light emitting diode chips being accommodated within the plurality of recesses respectively, wherein the plurality of light emitting diode chips are movable towards or away from the bottom of the recesses.

4. The light source according to claim 3, wherein the fluorescent powder layer is fixed.

5. The light source according to claim 1, further comprising:
a carrier having a plurality of protrusions which are arranged at a predetermined spacing on a side of the carrier facing towards the fluorescent powder layer, a plurality of light emitting diode chips being arranged at a predetermined spacing on the plurality of protrusions of the carrier respectively, the fluorescent powder layer having a plurality of recesses on its side facing towards the light emitting diode chips, the plurality of light emitting diode chips being accommodated within the plurality of recesses respectively, wherein the light emitting diode chips are movable towards or away from the bottoms of the recesses.

6. The light source according to claim 5, wherein the fluorescent powder layer has an elongated shape, the carrier having a strip shape, and the plurality of recesses are arranged in a row in a longitudinal direction of the fluorescent powder layer and the plurality of light emitting diode chips and the plurality of protrusions are arranged in a row in a longitudinal direction of the carrier.

7. The light source according to claim 6, wherein the side of the fluorescent powder layer facing towards the light emitting diode chips has a serrate shape.

8. The light source according to claim 5, wherein the fluorescent powder layer is fixed.

9. The light source according to claim 1, wherein the fluorescent powder layer is fixed.

10. The light source according to claim 1, wherein the side of the fluorescent powder layer facing away from the light emitting diode chips is configured to adhere onto a light incidence face of a light guide plate.

11. The light source according to claim 1, wherein the light emitting diode chip and the fluorescent powder layer are movable with respect to each other in a predetermined direction, and a thickness of the fluorescent powder layer at least at a location facing towards the light emitting diode chip increases or decreases along the predetermined direction.

12. The light source according to claim 11, wherein the fluorescent powder layer has an elongated shape, the predetermined direction being perpendicular to a longitudinal direction of the fluorescent powder layer, and the fluorescent powder layer has a wedged portion at least at a location facing towards the light emitting diode chip.

13. The light source according to claim 12, wherein the fluorescent powder layer comprises a first fluorescent powder layer and a second fluorescent powder layer, and when viewed in a plane perpendicular to the longitudinal direction of the fluorescent powder layer, an end of the first fluorescent powder layer with a smaller thickness and an end of the second fluorescent powder layer with a larger thickness are located on a same side in the predetermined direction, and the first fluorescent powder layer and the second fluorescent powder layer are moveable towards each other or away from each other.

14. The light source according to claim 13, wherein in a plane defined by the predetermined direction and the longitudinal direction of the first fluorescent powder layer and the second fluorescent powder layer, a projection of the first fluorescent powder layer in a direction perpendicular to the plane is at least partially overlapped with that of the second fluorescent powder layer in the direction perpendicular to the plane.

15. The light source according to claim 13, wherein the predetermined direction is substantially perpendicular to a direction in which the light emitting diode chip and the fluorescent powder layer face towards each other.

16. The light source according to claim 11, wherein the light emitting diode chip is fixed.

17. The light source according to claim 1, wherein the light emitting diode chip is a blue light emitting diode chip and the fluorescent powder layer is a yellow fluorescent powder layer.

18. A backlight module, comprising:
the light source according to claim 1; and
a light guide plate, having a light incidence face from which at least one part of light emitted from the light source enters the light guide plate.

19. A display apparatus, comprising:
the backlight module according to claim 18.

* * * * *